June 28, 1949. A. E. MOXLEY 2,474,754
LUBRICATOR
Filed Nov. 21, 1946
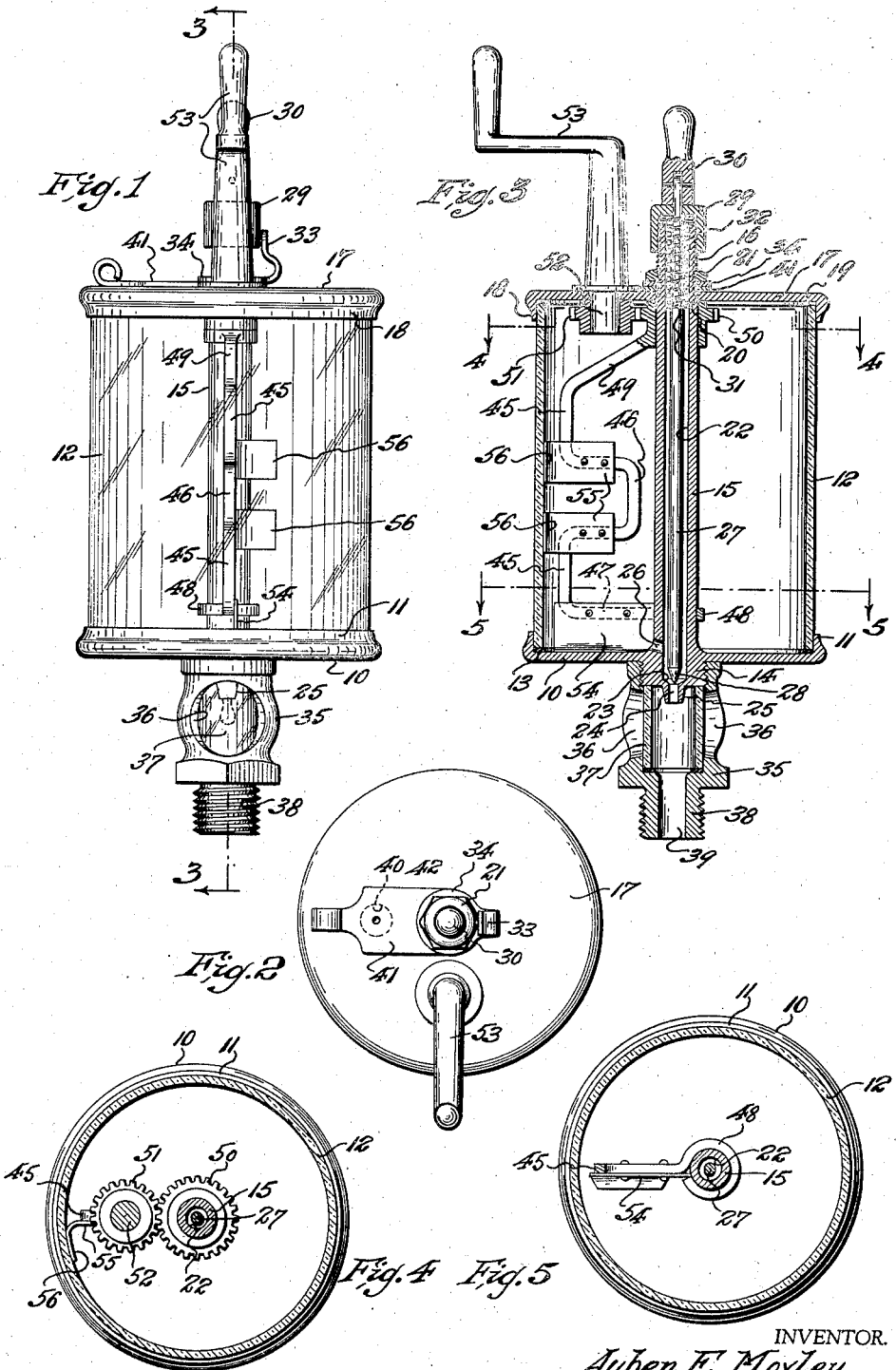
INVENTOR.
Auben E. Moxley
BY George D. Richards
Attorney Patented June 28, 1949

2,474,754

UNITED STATES PATENT OFFICE 2,474,754

LUBRICATOR

Auben E. Moxley, East Orange, N. J., assignor to Bel-Ray Company, Inc., Newark, N. J., a corporation of New Jersey Application November 21, 1946, Serial No. 711,274

7 Claims. (Cl. 184—82)

This invention relates to lubricating devices; and the invention has reference, more particularly, to a gravity feed lubricator which is especially adapted for use for emitting a lubricant comprising flake graphite suspended in a fluid vehicle such as an oil.

For the lubrication of moving conveyer chains and similar mechanisms, it is desirable to use graphite or a lubricant containing graphite. In many cases a graphite and oil mixture is daubed on the moving conveyer chains or similar mechanisms to be lubricated, but this is not altogether satisfactory because it usually requires hand application, and also for the reason that parts may be skipped and uniform application of the lubricant not assured. There is, therefore, a need for a lubricator which will automatically feed a graphite containing lubricant by gravity in a regular and uniform manner onto a moving conveyer chain or similar mechanism. Owing to the fact that a flowable graphite lubricant comprises a suspension of graphite particles in a liquid vehicle, such e. g. as an oil of suitable viscosity, the graphite content of such lubricant, when the lubricant stands in a supply reservoir, tends to precipitate or fall out of suspension, and thus collects as a thick, substantially non-flowable mass in the bottom of the reservoir. Such mass of precipitated graphite is not only practically non-flowable, but also tends to clog and choke off the discharge outlet of the reservoir. For these reasons a satisfactory automatic lubricator adapted to discharge a lubricant of the graphite suspension type has not, so far as I am aware, been heretofore available.

Having the above in view, it is an object of this invention to provide a novel construction of lubricant discharge means which is adapted for use with a suspended graphite lubricant, and which is operative to automatically feed the lubricant by gravity, preferably in a drop by drop manner, for discharge upon moving conveyer chains or similar mechanisms, or for delivery to parts of other types of mechanism desired to be lubricated.

The invention has for another object to provide a novel lubricant supplying and feeding means having manipulatable means whereby its content may be quickly and easily agitated for remixing any precipitated graphite particles in desired suspended relation to the carrying oil or other vehicle; said agitating means being also adapted to remove precipitated graphite from clogging or choking relation to the outlet of the supplying and feeding means; and said agitating means further including means for removing deposits of graphite from the side walls of the supply reservoir, said side walls being transparent, so as to clear said walls for vision therethrough, whereby the amount of lubricant contained within the reservoir may be from time to time observed, to facilitate determining when replenishment of lubricant is necessary.

A further object of the invention is to provide, in a lubricant supplying and feeding means of the kind above referred to, means for opening and closing the discharge passage thereof at will, including means for regulating said passage whereby to control and time drop by drop emission of the lubricant therefrom.

Other objects of this invention, not at this time more particularly enumerated, will be understood from the following detailed description of the same.

An illustrative embodiment of this invention is shown in the accompanying drawings, in which:

Fig. 1 is a side elevational view of the lubricator made according to this invention; Fig. 2 is a top end plan view thereof; Fig. 3 is a longitudinal vertical sectional view, taken on line 3—3 in Fig. 1; Fig. 4 is a horizontal sectional view, taken on line 4—4 in Fig. 3; and Fig. 5 is another horizontal sectional view, taken on line 5—5 in Fig. 3.

Similar characters of reference are employed in the above described views, to indicate corresponding parts.

Referring to the drawings, the novel lubricator of this invention comprises a reservoir member adapted to be filled with a lubricant mixture which consists of flake graphite (preferably 325 fine) suspended in a liquid such as an oil of suitable viscosity. The graphite content of the lubricant mixture is subject to more or less variation with respect to the proportion of graphite to oil, but a satisfactory mixture comprises one in which the graphite constitutes from 7% to 10% of the total mass.

Said reservoir member includes a bottom end plate 10 provided around its periphery with an upstanding annular keeper lip or flange 11. Seated on and upstanding from said bottom end plate 10, within the embrace of said keeper lip or flange 11, is the cylindrical tubular body portion 12 of the reservoir member. Said body portion 12 is made of a transparent material, preferably glass, through which the lubricant content of the reservoir is visible. In order to seal the joint between said body portion 12 and the bottom end plate 10, a sealing gasket 13 is interposed between these parts. Connected with the exterior side of the bottom end plate 10, preferably as an integral part thereof, is a centrally disposed externally screw-threaded boss 14. Also connected with said bottom end plate 10, preferably as an integral part thereof, to extend upwardly therefrom, is an axially disposed column 15, which is provided with an externally screw-threaded upper free end portion 16. The upper end of the body portion 12 of the reservoir member is closed by a top end plate 17, which is provided around its periphery with a dependent annular keeper lip or flange 18. Said keeper lip or flange 18 embraces the upper end of said body portion 12. In order to seal the joint between said body portion 12 and said top end plate 17, a sealing gasket 19 is also interposed between these parts. Said top end plate 17 is provided with a central opening 20 through which the screw-threaded upper end portion 16 of the column 15 extends for projection exteriorly of said top end plate. Said top end plate 17, body portion 12 and bottom end plate 10 of the reservoir member are secured together in assembled relation by a fastening nut 21, which is threaded onto the exteriorly projecting free end portion 16 of the column 15.

Said column 15 is provided with an upwardly open axial bore 22 which extends downwardly therethrough, and which terminates at its lower end in a valve seat 23 which surrounds a lubricant discharge port 24, the latter descending through a nozzle portion 25 which projects from the underside of the previously mentioned boss 14. Piercing the wall of said column 15, at a point closely adjacent to the bottom end plate 10, is at least one reservoir outlet port 26, whereby to provide communication between the interior of the reservoir member and the bore 22 of the column at a point above the discharge port 24.

Supported by the column 15 is a combined lubricant shut-off and drop regulating valve means. Said valve means comprises a valve stem 27 which extends axially downward through the bore 22 of the column, and which terminates at its lower end in a conical valve portion 28 which is opposed to the discharge port 24 for cooperation therewith. The upper end of said valve stem 27 projects exteriorly through a perforate cap 29 which is threaded onto the screw-threaded upper free end 16 of said column 15, outwardly of the heretofore mentioned fastening nut 21. The exteriorly projecting upper end of said valve stem 27 is pivotally coupled with a cam lever 30. Said cam lever 30 bears against the top of said cap 29. Mounted around the valve stem 27, between the end wall of said cap and an annular shoulder or collar 31 with which said valve stem is provided, is a compression spring 32.

The operation of the valve stem 27 and its valve portion 28 is controlled by manipulation of the cam lever 30. When said cam lever is turned about its pivotal connection with the valve stem to an upstanding axially aligned relation to the latter, the camming thrust of said cam lever against the cap 29 will exert a lifting effect upon the valve stem against the tension of the spring 32, whereby the valve portion 28 is raised from engagement with the seat 23 so as to open the discharge port 24 to outflow of lubricant therethrough (see Fig. 3). The degree of opening movement of the conical valve portion 28 relative to the discharge port 24, whereby to control the drop frequency of the discharged lubricant, may be regulated and selectively predetermined by turning the cap 29 up or down on the column 15, thus determining the amount of opening movement of the conical valve portion 28 relative to the discharge port 24, and consequently the area of opening permitted between the walls of said discharge port and the conical sides of the valve portion. The cap 29 is detained in a desired adjusted position by a yieldable detent member 33 which engages the serrated external sides of the cap 29. Said detent member 33 is secured in place by a perforate base portion 34 thereof, which is engaged over the external end of the column 15, and fixed to the top end plate 10 by the overlying fastening nut 21. When it is desired to close the valve port 24, the cam lever 30 is swung down to a horizontal position, thus releasing its upward pull upon the valve stem 27, so that the spring 32 may expand to thrust downward said valve stem and thereby move the valve portion 28 into engagement with the seat 23 and into closed relation to the discharge port 24.

Threaded onto the boss 14 of the bottom end plate 10 is a sight cage 35 having laterally aligned openings 36 in its opposite sides. Supported within said sight cage 35 is a tubular member 37 of transparent material, preferably glass. Said transparent member 37 surrounds the outlet nozzle 25 of the discharge port 24. The drop emission of lubricant from the nozzle 25 may be observed through the transparent member 37, whereby to facilitate manipulation of the valve means for regulating the drop emission at desired frequency. The lower end of said sight cage 35 terminates in an externally screw-threaded outlet neck 38 having an axial outlet bore 39. Said outlet neck may be utilized to fasten the lubricator to a support, whereby to position said lubricator in a desired location for service. Suitable additional means (not shown), adapted to lead the discharged lubricant to a desired point of application to mechanism to which said lubricant is desired to be served, may be connected for communication with the outlet bore 39.

The top end plate 17 is provided with a filling opening 40 for introducing the lubricant mixture into the reservoir member. Said filling opening 40 is normally closed by a displaceable cover plate 41, which is preferably mounted in pivoting relation to the exterior end of the column 15 to swing about the latter, when manipulated for opening or closing of said filling opening 40. Said cover plate 41 is held in operative assembled relation to said top end plate 10, together with the base 34 of the previously described detent member 33, by the fastening nut 21. Said cover plate 41 is provided with an air admission port 42 for communication with said filling opening 40.

The graphited lubricant is so blended that the contained graphite particles or flakes will remain suspended therein for several hours without sufficient precipitation thereof as to unduly impede gravity discharge of the lubricant from the lubricator. When the machinery to which the lubricant is served is shut down, and the valve means of the lubricator in such case is closed, so as to stand idle over a considerable period of time, such e. g. as overnight, or over a week-end, considerable precipitation of the suspended graphite particles or flakes occurs, so that said particles or flakes settle and collect in the bottom of the reservoir and form a substantially thickened and non-flowable mass. Before again putting the lubricator in service, it is necessary to remix the precipitated graphite particles or flakes with the oil or other liquid constituent of the lubricant, whereby to restore the former to normal suspended relation to and in the latter.

The lubricator of this invention is provided with a novel construction and arrangement of manipulatable means for agitating precipitated graphite particles or flakes and thus remixing the same with the oil or other liquid constituent in normal suspended relation to and in the latter. To this end, an agitator means is mounted within the reservoir member subject to be revolved therein about the column 15. This agitator means may be variously constructed and formed, but one illustrative form thereof, as shown, provides a mixer or agitator paddle formed by a bent rod to provide alternated outwardly directed and inwardly directed paddle loops 45 and 46. The lowermost paddle loop provides a bottom arm 47 which extends toward the column 15 adjacent to the reservoir bottom end plate 10. Said bottom arm 47 terminates in a swivelling eye 48 which encircles the column 15 so as to rotate thereon. The uppermost paddle loop provides a top arm 49 which also extends toward the column 15 adjacent to the reservoir top end plate 17. Said top arm 49 is affixed to the hub of a driven spur gear 50 which is mounted on the column 15 so as to rotate thereon.

The means for revolving said mixer or agitator paddle comprises a driving spur gear 51 which is fixed on the inner end of a rotatable shaft 52 for location adjacent the inner face of the reservoir top plate 17, and so as to mesh with and in driving relation to said driven spur gear 50 of the mixer or agitator paddle. Said shaft 52 is suitably journaled in the reservoir top end plate 17, and affixed to its outer end is a crank handle 53 by which it can be rotated to impart driving rotation to said spur gear 51. Said crank handle 53 is utilized for manual operation of the mixer or agitator paddle, but it will be understood that when conditions render it desirable, as e. g. when it is desired to simultaneously operate the mixer or agitator paddles of a plurality of lubricators, the shafts 52 of the latter may be power driven by means of any suitably applied power transmission.

Inasmuch as the accumulation of precipitated graphite particles or flakes tend to form a thickened and substantially non-flowing mass in the bottom of the reservoir member, which mass may in time rise sufficiently to cover the intake side of the reservoir outlet port 26 so as to obstruct or choke off the same, it is desirable to provide the mixer or agitator paddle with means adapted to cut away and dislodge any collected graphite from the front of said outlet port 26. To this end, a doctor blade 54 is secured to the bottom arm 47 of the mixer or agitator paddle, so as to revolve therewith. Free edges of said doctor blade 54 are shaped to conform to the contours of adjoining surfaces of the bottom end plate 10 and column 15 in the vicinity of said outlet port 26, so that said edges, when the doctor blade is revolved with mixer or agitator paddle, will wipe the thus contacted surfaces, whereby to clear away therefrom and from the vicinity of the outlet port 26 accumulated graphite which would otherwise obstruct the latter and prevent outflow of remixed lubricant therethrough.

It will be appreciated that, owing to the content of suspended graphite particles or flakes by which the lubricant is characterized, some adherence of graphite particles or flakes to the inner surface of the transparent body portion 12 of the reservoir member is likely to occur, which will tend to obscure the transparency of said body portion, so that the amount of lubricant contained in the reservoir member cannot readily be visibly ascertained. To avoid this condition, and to assure observance of said lubricant content from time to time, whereby to advise as to necessity for replenishment thereof, the mixer or agitator paddle is provided with means adapted by revolution of the paddle, to wipe clear of adhering graphite at least one or more zones of the inner surface of said transparent body portion 12, so that vision therethrough is unobscured. The means for such purpose, in one illustrative form thereof as shown, comprises wiper blades 55, which are made of sheet material, preferably sheet metal. Said wiper blades are suitably affixed to the mixer or agitator paddle so as to project outwardly therefrom, and are provided with flexible free end portions 56 adapted to resiliently press against the internal surface of the transparent body portion 12 of the reservoir member with graphite removing effect, when the mixer or agitator paddle is revolved.

When the valve means of the lubricator is closed and thereafter the lubricator stands idle for any considerable length of time, before opening the valve means and again putting the lubricator in service, the crank handle 53 is turned, whereby to revolve the mixer or agitator paddle. By thus revolving the mixer or agitator paddle, the same is caused to loosen up any mass of precipitated graphite which has formed in the bottom of the reservoir member, and, by agitation thereof, again mix the same through the oil or other liquid constituent of the lubricant, whereby to bring said graphite back into suspension therein and into flowable condition. At the same time, the movement of the doctor blade 54 around the column 15 cuts away and dislodges any accumulated precipitated graphite in the vicinity of the outlet port 26, so as to remove the same from the entrance to the latter, thus assuring later unobstructed flow of the lubricant mixture therethrough, and thence to and through the discharge port 24, when the latter is opened. When the mixer or agitator paddle is thus revolved, the wiper blades 55—56 are also caused to traverse the inner surface of the transparent body portion 12 of the reservoir member, whereby to clear the same for vision therethrough and observance as to any need for replenishing the lubricant content of the reservoir member. These things having been done, the valve means of the lubricator may be thereupon opened so as to put the lubricator back in lubricant discharging operation.

Having now described my invention, I claim:

1. A lubricator comprising a reservoir member having transparent side walls, said reservoir member being provided with manipulatable valve controlled discharge means, a revolvable lubricant agitator means mounted within said reservoir member to freely revolve about said discharge means, said agitator means having wiper means adapted to traverse the interior surface of the transparent side walls of said reservoir member when said agitator means is revolved, and means for revolving said agitator means.

2. A lubricator comprising a reservoir member having a lubricant outlet and a manipulatable valve controlled discharge means with which said outlet communicates, a revolvable lubricant agitator means within said reservoir member, a doctor blade carried by said agitator means, said doctor blade being adapted to traverse the mouth of said lubricant outlet when said agitator means is revolved, and means for revolving said agitator means.

3. A lubricator comprising a reservoir having transparent side walls, said reservoir means having a lubricant outlet and a manipulatable valve controlled discharge means with which said outlet communicates, a revolvable lubricant agitator means mounted within said reservoir member, a doctor blade carried by said agitator means, said doctor blade being adapted to traverse the mouth of said lubricant outlet when said agitator means is revolved, said agitator means being further provided with wiper means adapted to traverse the interior surface of the transparent side walls of said reservoir member when said agitator means is revolved, and means for revolving said agitator means.

4. A lubricator comprising a reservoir member having a column extending axially therethrough, a lubricant discharge means at the bottom of said reservoir member including a discharge port, said column having an axial bore communicating with said discharge port, a valve stem housed in said bore, said valve stem having a valve member at its lower end for cooperation with said discharge port, means connected with the exterior upper end of said column cooperative with said valve stem for manipulating said valve member, said column having a lubricant outlet leading through its wall from the lower interior of said reservoir member into said column bore above the discharge port, a lubricant agitator means mounted on and to revolve around said column within the reservoir member, a doctor blade carried by said agitator means, said doctor blade being adapted to traverse the mouth of said lubricant outlet when said agitator means is revolved, and means for revolving said agitator means.

5. A lubricator comprising a reservoir member having a column extending axially therethrough, a lubricant discharge means at the bottom of said reservoir member including a discharge port, said column having an axial bore communicating with said discharge port, a valve stem housed in said bore, said valve stem having a valve member at its lower end for cooperation with said discharge port, means connected with the exterior upper end of said column cooperative with said valve stem for manipulating said valve member, said column having a lubricant outlet leading through its wall from the lower interior of said reservoir member into said column bore above the discharge port, a lubricant agitator means mounted on and to revolve around said column within the reservoir member, a doctor blade carried by said agitator means, said doctor blade being adapted to traverse the mouth of said lubricant outlet when said agitator means is revolved, a rotatable shaft journaled in and through the upper end wall of said reservoir member, a driving gear on the inner end of said shaft, a driven gear on the upper end of said agitator means in mesh with said driving gear, and means on the exterior end of said shaft for rotating the same to effect, through said gearing, revolving movement of said agitator means.

6. A lubricator as defined in claim 4, wherein said reservoir member is provided with transparent side walls, and said agitator means is further provided with wiper means adapted to traverse the interior surface of said transparent side walls when said agitator means is revolved.

7. A lubricator as defined in claim 5, wherein said reservoir member is provided with transparent side walls, and said agitator means is further provided with wiper means adapted to traverse the interior surface of said transparent side walls when said agitator means is revolved.

AUBEN E. MOXLEY.

REFERENCES CITED

The following references are of record in the file of this patent:

UNITED STATES PATENTS

| Number | Name | Date |
|---|---|---|
| 107,826 | Smith | Sept. 27, 1860 |
| 639,293 | Ritter | Dec. 19, 1899 |
| 928,686 | Newbaker | July 20, 1909 |
| 1,367,471 | Hart | Feb. 1, 1921 |